(12) United States Patent
Venkataraman et al.

(10) Patent No.: US 11,076,330 B2
(45) Date of Patent: Jul. 27, 2021

(54) INTELLIGENT CORE NETWORK SELECTION

(71) Applicant: Apple Inc, Cupertino, CA (US)

(72) Inventors: Vijay Venkataraman, Sunnyvale, CA (US); Lakshmi N. Kavuri, San Jose, CA (US); Muthukumaran Dhanapal, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/855,117

(22) Filed: Apr. 22, 2020

(65) Prior Publication Data

US 2020/0389828 A1 Dec. 10, 2020

Related U.S. Application Data

(60) Provisional application No. 62/842,101, filed on May 2, 2019.

(51) Int. Cl.
| | |
|---|---|
| *H04W 36/00* | (2009.01) |
| *H04W 36/14* | (2009.01) |
| *H04W 76/12* | (2018.01) |
| *H04W 76/27* | (2018.01) |

(Continued)

(52) U.S. Cl.
CPC ....... *H04W 36/14* (2013.01); *H04W 36/0022* (2013.01); *H04W 36/0069* (2018.08); *H04W 48/18* (2013.01); *H04W 74/0833* (2013.01); *H04W 76/12* (2018.02); *H04W 76/27* (2018.02)

(58) Field of Classification Search
CPC ..... H04W 36/14; H04W 76/12; H04W 76/27; H04W 36/0069; H04W 36/0022; H04W 48/18; H04W 74/0833
See application file for complete search history.

(56) References Cited

U.S. PATENT DOCUMENTS

| | | | |
|---|---|---|---|
| 8,306,559 B2 * | 11/2012 | Lee ........................ | H04W 68/02 455/458 |
| 8,537,855 B2 * | 9/2013 | Wieslawa ............... | H04W 4/18 370/466 |
| 9,277,582 B2 * | 3/2016 | Tabet .................... | H04W 76/19 |

(Continued)

FOREIGN PATENT DOCUMENTS

| | | |
|---|---|---|
| EP | 3634043 A1 | 8/2020 |
| WO | 2020076224 A1 | 4/2020 |

*Primary Examiner* — Amancio Gonzalez
(74) *Attorney, Agent, or Firm* — Kowert, Hood, Munyon, Rankin & Goetzel, P.C.

(57) ABSTRACT

Apparatuses, systems, and methods for a user equipment device (UE) to establish a connection with a core network through a base station configured with mixed core network deployment, wherein the base station is communicatively coupled to each of a LTE core network (CN) such as an evolved packet core (EPC) and a 5G CN. The UE determines a preference for establishing a connection with one of the EPC or the 5G CN based on one or more of a device type of the UE, an active data flow running on the UE, an availability of network slices or packet data unit (PDU) sessions through each core network, or historical network performance of a particular CN. The UE transmits a message to the base station indicating the determined preference. The UE subsequently receives a response from the base station establishing a connection with the indicated preferred core network.

20 Claims, 8 Drawing Sheets

(51) Int. Cl.
    *H04W 48/18*     (2009.01)
    *H04W 74/08*     (2009.01)

(56) References Cited

U.S. PATENT DOCUMENTS

| | | | |
|---|---|---|---|
| 9,794,870 B2 * | 10/2017 | Vannithamby | H04W 48/18 |
| 10,868,733 B2 * | 12/2020 | Dribinski | H04W 36/00837 |
| 2019/0253867 A1 | 8/2019 | Abedini et al. | |
| 2020/0092795 A1 * | 3/2020 | Raval | H04W 48/18 |
| 2020/0275259 A1 * | 8/2020 | Zhu | H04W 8/24 |
| 2020/0329395 A1 * | 10/2020 | Pezeshki | H04B 7/0695 |

* cited by examiner

INTELLIGENT CORE NETWORK SELECTION

PRIORITY CLAIM

This application claims priority to U.S. Provisional Patent Application No. 62/842,101, titled "Intelligent Core Network Selection" and filed on May 2, 2019, which is hereby incorporated by reference in its entirety, as though fully and completely set forth herein.

FIELD

The present application relates to wireless devices, and more particularly to apparatus, systems, and methods for a wireless device to intelligently select a core network in an eLTE mixed deployment.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow increased flexibility in time resource allocation for uplink and/or downlink message scheduling.

During the rollout phase of 5G-NR, 5G-NR may coexist with legacy LTE technology, in some cases. To address complications arising from such dual-RAT environments, improvements in the field may be desirable.

SUMMARY

Embodiments relate to apparatuses, systems, and methods to intelligently perform core network selection in a mixed core network deployment by a user equipment device (UE) in communication with a base station (e.g., an eNB or a gNB).

In some embodiments, a UE may discover a base station configured with mixed core network deployment, wherein the base station is communicatively coupled to each of a LTE core network (CN) such as an evolved packet core (EPC) and a 5G CN such as a 5GC.

In some embodiments, the UE may intelligently determine a preference for establishing a connection with one of the EPC or the 5GC. The UE may determine its preference based on a variety of factors, according to different embodiments, such as a device type of the UE, an application type running on the UE, or availability of network slices through each core network, among other possibilities.

In some embodiments, the UE may transmit a message to the base station indicating the determined preference. The UE may subsequently receive a response from the base station establishing a connection with the indicated preferred core network.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
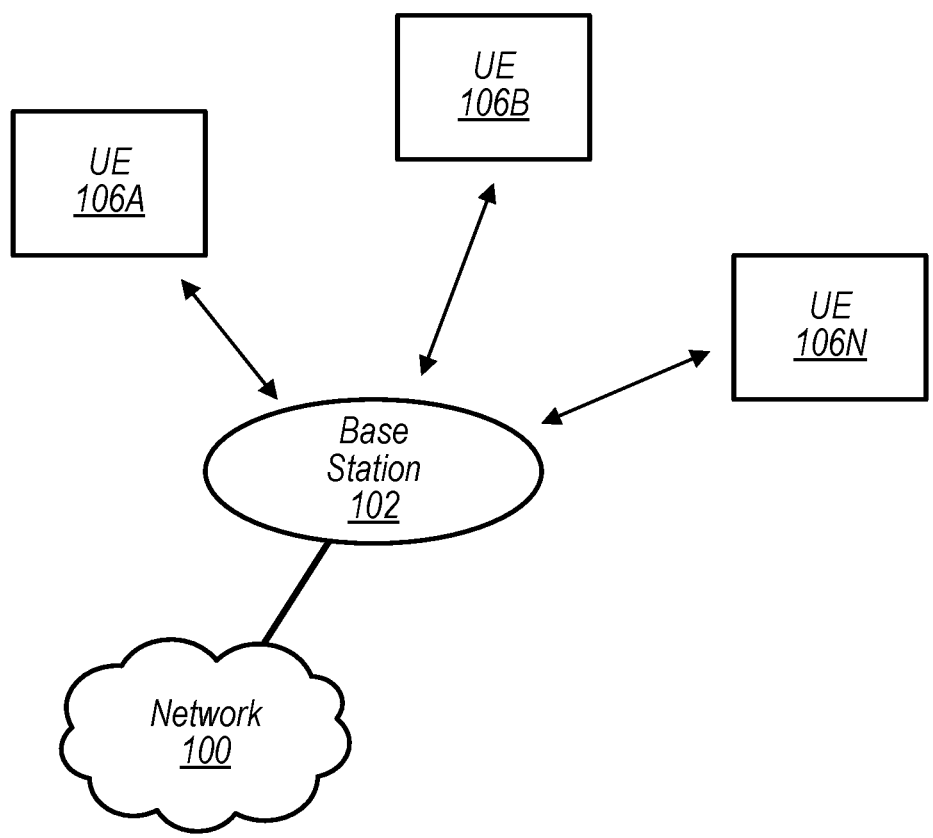
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory and circuitry, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" or "user equipment device" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core network (EPC) and/or to a 5G core network (5GC). In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
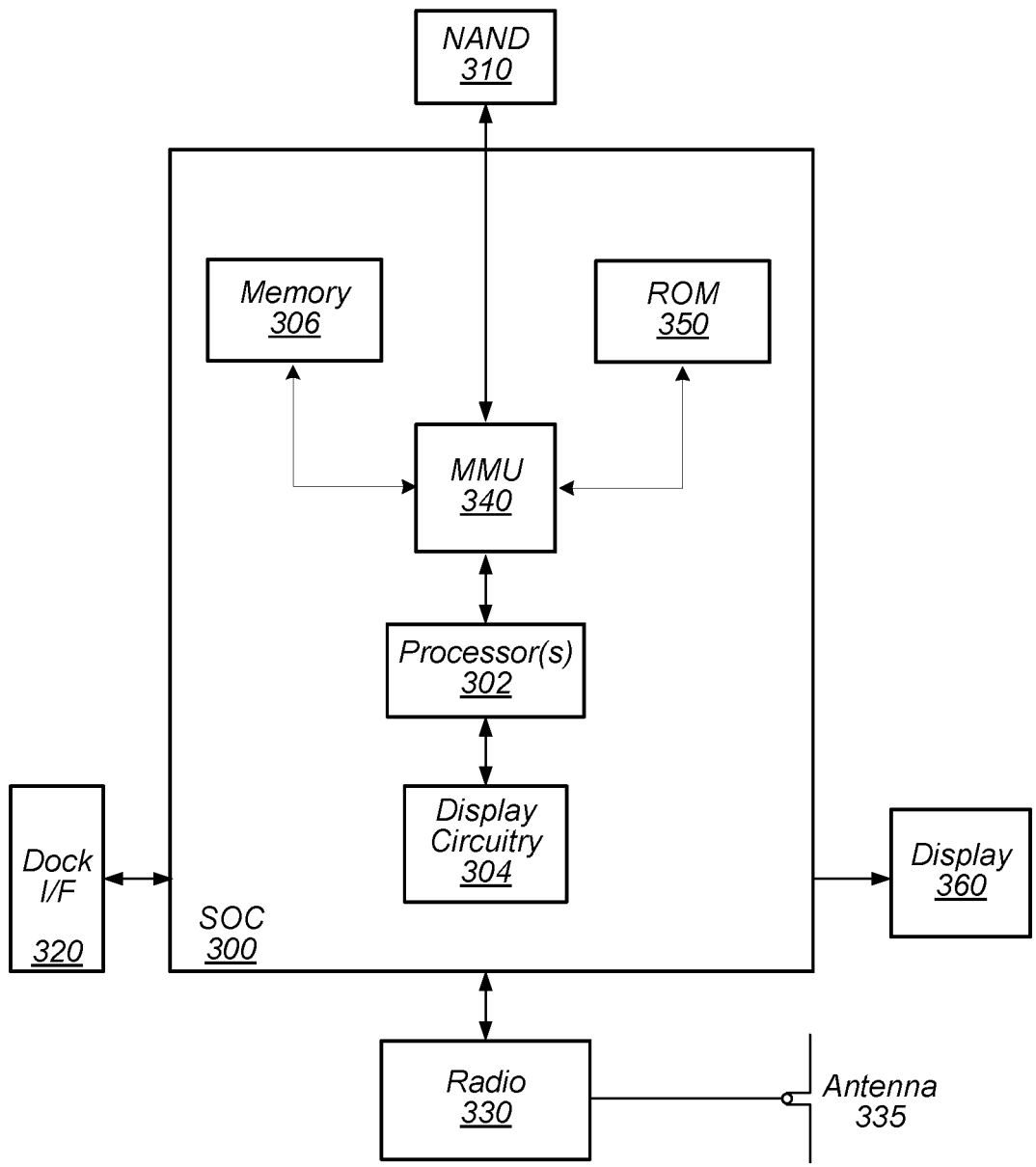
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including performing one or more of periodic beam quality measurements and/or event based beam quality measurements, determining, based at least in part on one or more of the periodic beam quality measurements and/or the event based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommend beam quality measurement configuration.

As described herein, the communication device 106 may include hardware and software components for implementing the above features for recommending a beam quality measurement configuration. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
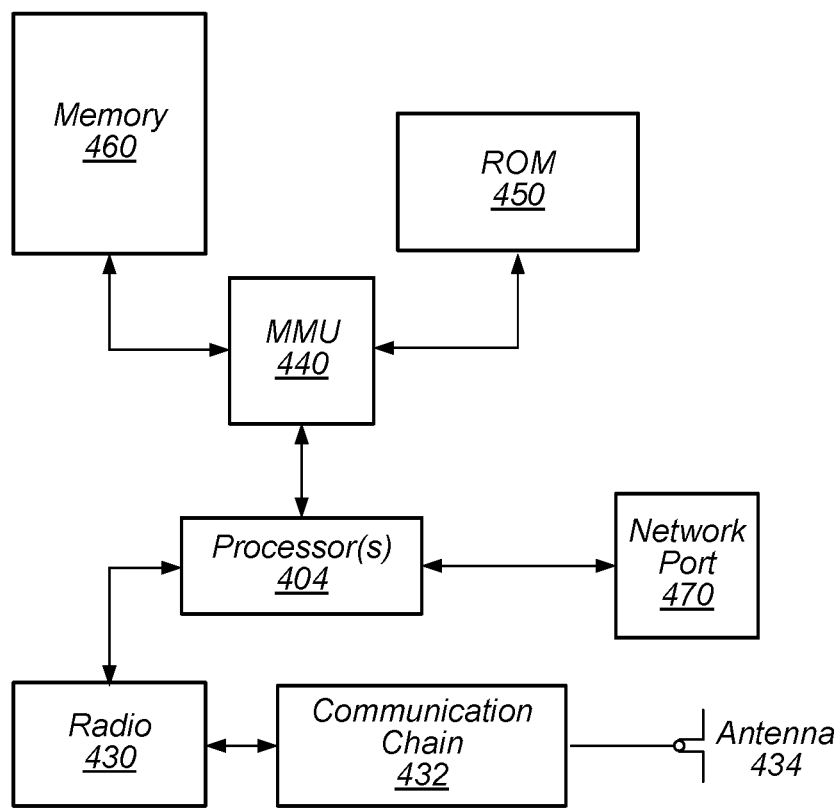
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
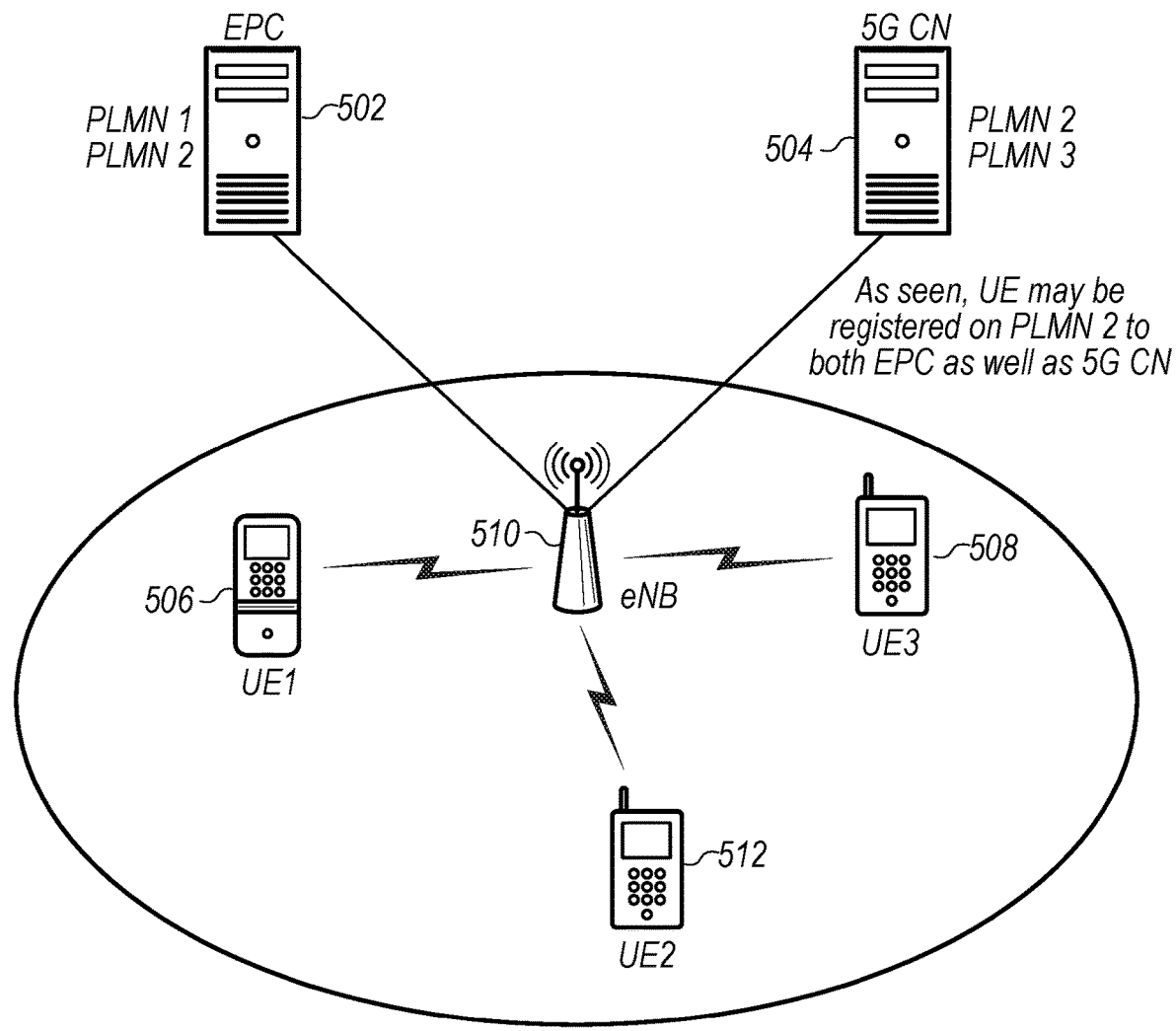
FIG. 5 is an example wireless communication system exhibiting a mixed core network deployment, according to some embodiments.

FIG. 5—Core Network Selection for Mixed LTE and 5G Deployments

FIG. 5 illustrates an enhanced LTE (eLTE) communication system including a mixed LTE and 5G deployment scenario, according to some embodiments. It is anticipated that the rollout of next generation 5G technology may involve mixed deployments, wherein a legacy base station (e.g., the eNB illustrated in FIG. 5, which operates according to the LTE radio access technology (RAT)) may be communicatively coupled to two core networks associated with each of the legacy LTE network and the 5G network. For example, as illustrated, the eNB is in communication with each of an evolved packet core (EPC) associated with LTE and a 5G core network (5GC). Each of the core networks may operate one or more public land mobile networks (PLMNs), and one or more PLMNs may operate in each of the two core networks. For example, as illustrated, PLMN 2 operates in each of the EPC and the 5GC, and a UE such as UE1 may be registered on PLMN 2 to both the EPC and well as the 5GC.

In the scenario illustrated in FIG. 5, a UE registered on a PLMN such as PLMN 2 may have the option of connecting to either of the LTE CN or the 5GC. Depending on a variety of factors, connecting to either of the core networks may be more or less desirable. Embodiments herein present apparatus and methods for intelligently and dynamically determining which core network to connect to in a mixed deployment scenario.

While FIG. 5 illustrates a scenario where a legacy LTE base station is connected to each of an LTE CN and a 5GC, other possibilities are also within the intended scope of this disclosure. For example, a 5G NR base station such as a gNB may also be utilized in a mixed deployment, where the gNB is connected to each of an LTE CN and a 5GC.

FIG. 6—Core Network Selection Procedure

Figure 6A:
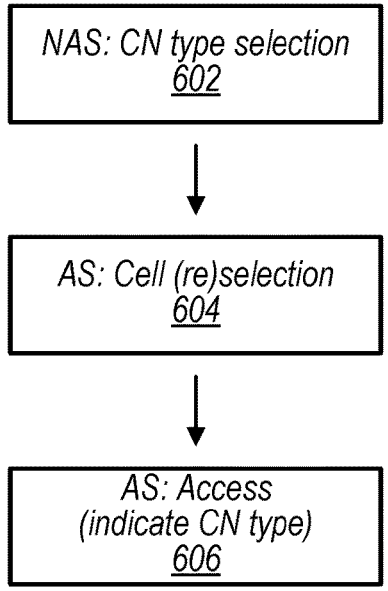
FIG. 6A is a flowchart diagram illustrating a method for performing core network selection, according to some embodiments.
Figure 6B:
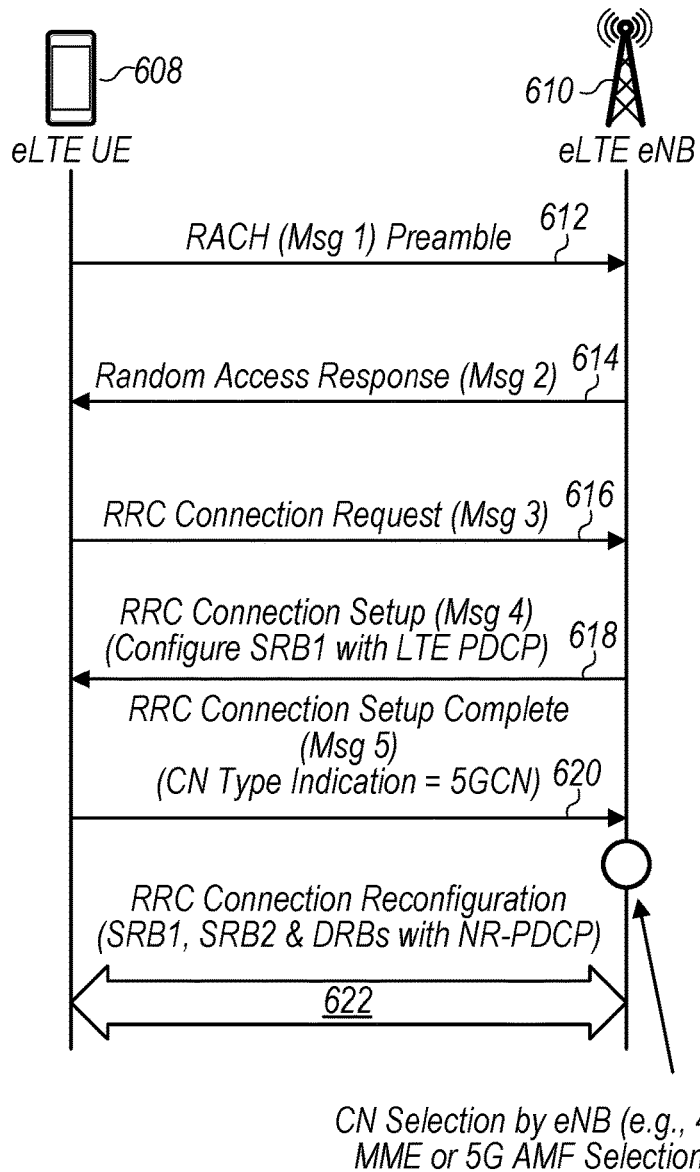
FIG. 6B is a communication flow diagram illustrating a radio resource control (RRC) connection setup and core network selection, according to some embodiments.

FIGS. 6A-B illustrate a method for selecting a core network, according to some embodiments. As illustrated in FIG. 6A, CN type selection may initially occur at the network access stratum (NAS) layer, followed by cell selection and/or reselection in the access stratum (AS). Finally, an indication of CN type may be transmitted through the AS, followed by grant of access.

FIG. 6B illustrates a more detailed communication flow diagram illustrating the message exchange between a UE and an eNB to perform CN selection, according to some embodiments. As illustrated, a UE may transmit a random access procedure (RACH) preamble message (Msg 1) to a base station, and the base station may respond with a random access response (Msg 2). The UE may then transmit an RRC connection request (Msg 3), and in response the base station may transmit an RRC connection setup message (Msg 4) to configure a system resource block (SRB) such as SRB 1 with an LTE packet data convergence protocol (PDCP). Subsequently, the UE may include a CN type Indication (e.g., indicating either 5GC or EPC) as part of the RRC Connection setup complete message (Msg 5), and the base station may respond with an RRC connection reconfiguration to configure the connection with the 5GC, e.g., using an NR-PDCP.

If the UE is capable of both N1 mode (e.g., which supports 5G) and S1 mode (which supports LTE) and the lower layers provide an indication that the current E-UTRA cell is connected to both EPC and 5GCN, the UE may select a core network type (EPC or 5GCN) based on the PLMN selection procedures and provide the selected core network type information to the lower layer during the initial registration procedure. In some embodiments, if the PLMN selection information provisioned in the USIM does not contain any prioritization between E-UTRAN and NG-RAN for a PLMN, which core network type to select for that PLMN may be up to UE implementation. As described in greater detail below, embodiments herein describe selection of CN type based on various scenarios and considerations.

Core Network Selection Criteria

A UE may utilize a variety of criteria to determine a CN type to select, according to various embodiments. For example, in some embodiments, a CN type may be selected based on a device type of the UE. For example, smart meters may have very small data to be sent to the network at a sparse periodic interval such as once every 24 hours. These devices may benefit from utilizing a mobile-initiated connection only (MICO) mode, where the UE refrains from performing paging monitoring. Accordingly, in some embodiments a smart meter UE may specify the 5GC as its CN type. As another example, smart autonomous vehicles may take advantage of the low latency communication offered via URLLC in 5G, and as a result, they may also specify 5GC as their CN type. As a third example, current generation smartphones may function with sufficient effectiveness to result in a positive user experience using LTE features, and may not require the advanced features being offered by 5G. Accordingly, current generation smartphones may specify an LTE CN as their CN type, although smartphones may also specify 5G, depending on other criteria discussed below.

In other embodiments, CN type selection may be dynamically performed based on device state, a type of application running on the device, and/or a type of upcoming communication. For example, when an eNB is connected to both the EPC (or another LTE CN) and the 5GC, a UE may be dual registered on both the networks and may establish a connection with the appropriate CN type depending on the current operation of the UE. For example, if a wearable device such as a smart watch is operating according to a mode of operation that does not have strict latency requirements or high throughput demands such as accessing stocks or a weather app, the UE may choose its CN Type as an EPC, which may satisfy all the requirements of the respective operation mode. As another example, when an emergency voice call is initiated, the 5GC may not support voice call services. Alternatively, the 5GC may support voice call services but may not guarantee a threshold level of bitrate throughput appropriate for voice calls. In some other embodiments, though the emergency call may succeed over 5G, the network may not be able to query the location of the user over 5G. This may be undesirable since the emergency services provider may not know where to dispatch the police and/or ambulance groups. Accordingly, in such cases, the UE may choose its CN Type as EPC (e.g., if emergency support for LTE over the information management system (IMS) is broadcasted).

As another example, if a health monitoring application such as a heart rate monitoring application is running on the UE, the UE may desire to have an extremely low latency communication with the server for real time heart rate monitoring and feedback. Accordingly, the UE may choose its CN type as 5GC, in order to leverage ultra-reliable low-latency communication (URLLC) feature offered by the 5GC. As yet another example, a radio streaming application or another streaming application may be running on the UE and streaming audio and/or video, which may typically have periodic connections with the server to fetch the data. For example, a radio streaming app may buffer data every 10 secs. In these embodiments, instead of transitioning from an RRC connected mode to an RRC Idle mode between every buffering instance, the UE may take advantage of the RRC Inactive state introduced for 5G RRC connections. Transitioning between RRC Inactive to RRC Connected may incur less energy expenditure and time delay than transitioning between RRC Idle and RRC Connection, such that when a UE is running a streaming application, it may be desirable for the UE to choose its CN type as 5GC.

In some embodiments, selection of CN type may be performed dynamically based on service support status for each of the CN types. For example, a home PLMN (HPLMN) may configure network slice support for multiple visitor PLMNs (VPLMNs), or across multiple packet data unit (PDU) sessions. Network slice selection assistance information (NSSAI) may be utilized on a per-PLMN basis to inform the UE of the network slice allocation. For example, a particular network slice for a particular service may be supported on VPLMN "1", but not supported on V-PLMN "2". As yet another example, a network slice for a particular service may be supported on PDU Session 1 which is associated with data network name (DNN) 'A', but not on PDU Session 2 which is associated to DNN 'B'. Depending on the VPLMN or PDU session and the slices supported, the UE may decide to establish a connection with either the EPC or 5GC. Additionally, services such as voice calls, short message service (SMS), and other services may only be offered via one of the core networks. Thus, depending on the intent of the session, the UE may initiate a connection over either the EPC or the 5GC.

In some embodiments, CN type selection may be performed based on historical device metrics. For example, there may be certain common functionalities offered by both the EPC and 5GC, e.g., both core networks may guarantee throughput in excess of 450 Mbps. In these embodiments, a UE may operate at an acceptable level if a connection is set up with either of the core networks. However, in some embodiments, if one of the core networks (e.g., the LTE CN) is more heavily loaded with UE traffic, a UE connected to the LTE CN may need to use higher transmission power for transmissions, and connecting to the LTE CN may lead to higher battery drain. In some embodiments, one of the networks may send a SERVICE REJECT, RRC REJECT, PDU SESSION ESTABLISHMENT REJECT, or PDU SESSION MODIFICATION COMMAND REJECT message, indicating high congestion on the network. In these embodiments, the UE may prefer to choose the core network that is experiencing less traffic (which may be either the 5GC or the EPC, depending on traffic conditions) as the core network for a subsequent connection.

In some embodiments, limitations of one or the other of the core networks may be used to guide CN type selection. For example, the maximum transmissible message size on LTE is 8,192 bytes, while the maximum message size over the air on 5G NR is 9,000 bytes. Additionally or alternatively, 5G NR may support segmentation of RRC messages which may enable transmission and reception of larger message sizes on NR. Accordingly, if a UE anticipates that it may need to send one or more messages (eg: UE capability message) that exceed the limitation of 8,192 bytes, the UE may decide to choose the 5GC, to avoid exceeding the maximum message size.

CN Type Selection during Re-direction Procedures

In some embodiments, the network may send a NR RRC connection release message with a redirection to LTE indication, with either a specific frequency or list of frequencies (or alternatively a specific CN type) for performing the redirection. In these embodiments, the UE may perform one or more of the following procedures such that the redirection is biased towards NR.

In some embodiments, the CN type selection procedure implemented by the UE may be based on priorities indicated in a SIM card of the UE. In some embodiments, the UE may bucketize the available frequencies for redirection based on the CN type associated with each frequency. As one example, the UE may create 3 buckets. A 1st bucket may include Frequencies which supports CN type=5GC only, a 2nd bucket may include frequencies which support CN Type=LTE only, and a 3rd bucket may include frequencies which support both 5GC and EPC CNs.

If a data session that is ongoing when the redirection indication is received is for high priority data or is a delay sensitive procedure, the UE may prioritize the redirection procedure based on the following order:

First, redirection may be attempted on frequencies present in 1st bucket, followed by frequencies present in 3rd bucket, followed by frequencies/cells present in an acquisition database (ACQ DB) stored on the UE whose CN type is indicated as either 5G or both 5G and LTE, followed by frequencies present in 2nd bucket. Accordingly, redirection may be preferentially performed to a 5GC, if possible, thus preserving the quality of the high priority or delay sensitive data session.

If a data session that is ongoing when the redirection indication is received is not critical or is related to a voice and/or emergency call, the UE may prioritize redirection procedure based on the following order:

First, redirection may be attempted on frequencies which have the strongest signal strength, irrespective of their CN type. If two candidates are of similar signal strength, the tie may be broken based on CN type in which a priority ranking of LTE CN+5GC>5GC>LTE CN may be utilized for a data transfer procedure and LTE CN+5GC>LTE CN>5GC may be utilized for voice, emergency, and/or IMS procedures. Typically, the internet protocol multimedia subsystem (IMS) core network is expected to be common between the EPC and the 5GC, thus it may be desirable to prioritize the EPC for higher reliability. (Note that LTE CN+5GC denotes a frequency that supports both a LTE CN and a 5GC).

This mechanism may assist the UE in selecting a more desirable core network during redirection, thereby providing user benefits in utilization of both the LTE CN and the 5GC.

Figure 7A:
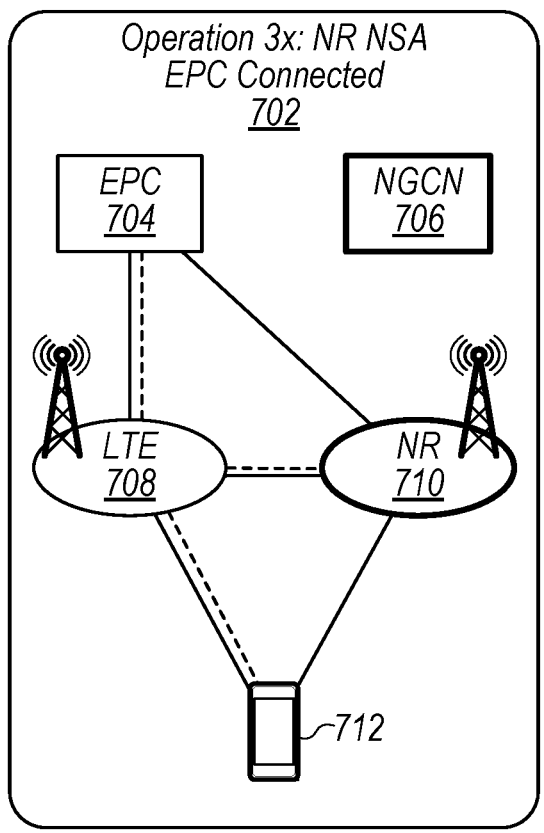
FIGS. 7A-B illustrate non-standalone and standalone communication scenarios, according to some embodiments.
Figure 7B:
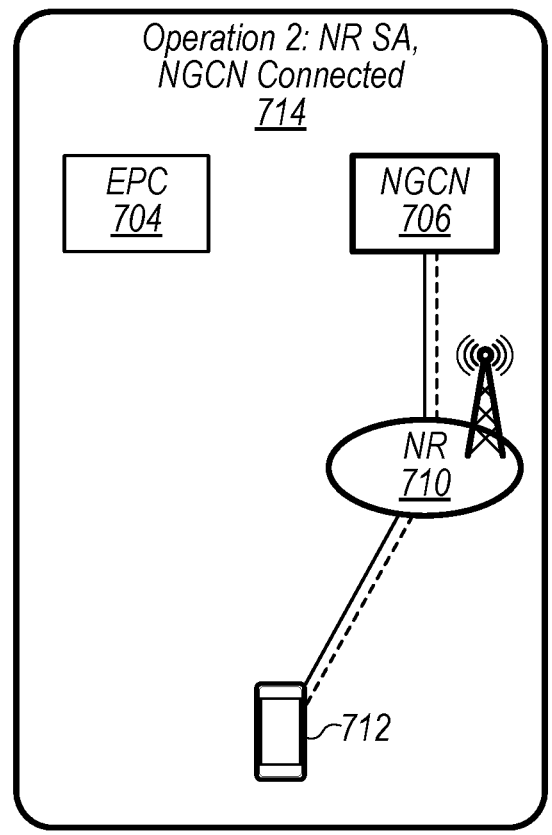

FIGS. 7A-B—ENDC and Standalone Deployments

In some embodiments, a UE device may operate in an area with an EUTRA NR Dual Connectivity (ENDC) deployment, with both a NR gNB in a non-standalone (NSA) deployment and an LTE eNB both connected to an EPC, as illustrated in FIG. 7A. Subsequently, the UE device may migrate to an area with NR standalone (SA) deployment as illustrated in FIG. 7B. During the rollout phase of 5G NR, some locations may still have spotty NR SA coverage, potentially making it difficult for the UE to quickly find good NR coverage. Accordingly, during a deployment scenario change, it may be desirable for the UE to detect if a 5G NR cell is available in the area as soon as possible.

Since the UE may not know whether NR is deployed as an ENDC or a SA architecture, UE may implement the following procedure, according to some embodiments. On the other hand, if the UE is able to confidently determine the 5G deployment status based on carrier specific static settings or other information (i.e., if the UE is able to determine whether NR is being locally deployed as ENDC or SA), the UE may directly scan for 5G and refrain from implementing the following mechanisms. Otherwise, the UE may scan LTE first if the UE is not sure whether 5G is deployed as ENDC or in a SA format.

In some embodiments, the UE may camp on any available LTE cell on the selected PLMN with a strong signal and may immediately start decoding optional system information (OPTIONAL SI) SIB-24 which may indicate whether NR neighbor cells are present or not. For example, the UE may scan frequencies used for LTE for an available cell, and may camp on the first discovered cell with a signal strength above a pre-determined threshold level. If SIB-24 is not currently being broadcasted by the LTE cell, the UE may request an on-demand SIB-24 via the RRCSystemInfoRequest procedure. If system information for NR neighbor cells is not available from the camped-on LTE cell, the UE may infer that NR is being deployed in an ENDC format. In these embodiments, if the camped-on cell does not meet predetermined criteria (e.g., if it does not satisfy an S criteria check) the UE may detach the current serving cell and may continue scanning LTE frequencies to discover the LTE cell with the strongest signal. The UE may then camp on this cell so that the ENDC feature can be enabled. Otherwise (e.g., if the S criteria check was successful), the UE may stay camped on the same LTE cell and enable ENDC. In some embodiments, enablement or disablement of ENDC may be initiated by the UE by setting the dual connectivity NR (DCNR) bit to "dual connectivity with NR supported" or "dual connectivity with NR restricted", respectively, in the UE network capability information element (IE) of the TRACKING AREA UPDATE REQUEST message.

If system information for a NR neighbor cell is available, the UE may abort camping on the LTE cell either by performing a forced L2NR reselection procedure based on the system information (for NR neighbor cell) or by ignoring the current serving LTE cell and starting a cell selection procedure on the NR system in standalone mode. These embodiments may assist the UE in selecting the most optimal cell (LTE cell for 5G NSA deployment, or 5G NR cell for SA deployments).

Figure 8:
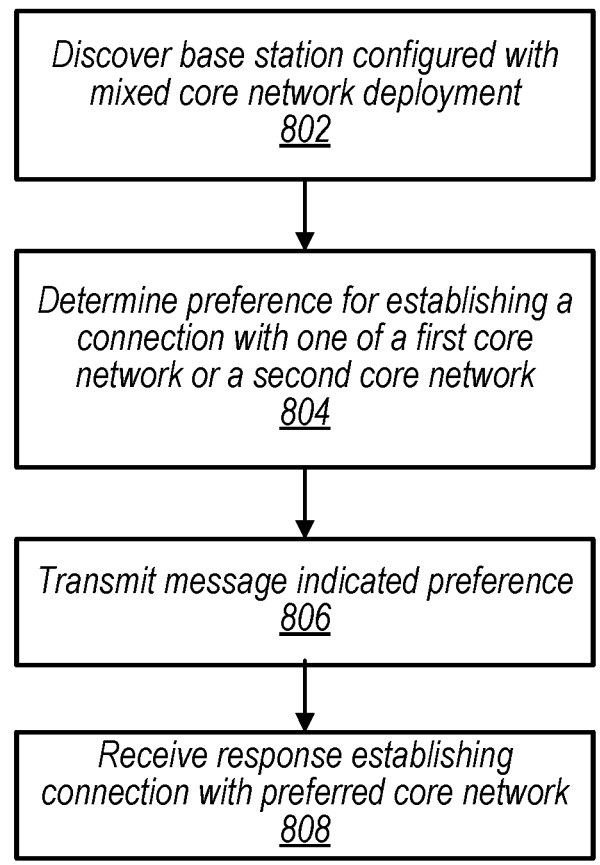
FIG. 8 is a flowchart diagram illustrating a method for a UE to perform core network selection in a mixed core network deployment, according to some embodiments.

FIG. 8—Flowchart diagram for Intelligent Core Network Selection

FIG. 8 is a flowchart diagram illustrating a method for a UE to perform core network selection in a mixed core network deployment, according to some embodiments. The methods described in reference to FIG. 8 may be implemented by a UE 106 or a processor including circuitry included within a UE, such as those illustrated in FIG. 3, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the scheme shown may be performed concurrently, in a different order than shown, or may be omitted. Additional and/or alternative elements may also be performed as desired. As illustrated, the method of FIG. 8 may operate as follows.

At 802, the UE may discover a base station. In various embodiments, the base station may be an eNB or a gNB, and the connection may be a radio resource control (RRC) connection using either an LTE or 5G NR radio access technology. Other types of base stations and/or connections are also possible. The base station may be configured to operate according to a mixed core network deployment, wherein the base station is in communication with each of a first core network associated with a first radio access technology (RAT) and a second core network associated with a second RAT. For example, regardless of whether the base station is an LTE base station or a 5G NR base station, the base station may be in communication with each of an LTE core network (e.g., an EPC) and a 5G core network (e.g., a 5GC).

At 804, the UE may determine a preference for establishing a connection with one of the first core network or the second core network. In some embodiments, the preference for establishing the connection with one of the first core network or the second core network is determined based on a device type of the UE.

In some embodiments, the preference for establishing the connection with one of the first core network or the second core network is determined based on an application type running on the UE. Alternatively, or additionally, the preference may be based on an upcoming type of data transmission with the network. For example, the preference may be based on a data pattern (e.g., an application data pattern)

of the upcoming data transmission, the application performing the data transmission, etc. For example, the first data pattern may experience improved performance on the first core network, and a preference may be determined for establishing the connection with the first core network.

In some embodiments, the application type running on the UE is capable of utilizing a radio resource control (RRC) inactive state. In these embodiments, the first core network may support the RRC inactive state, and the first core network may be determined to be the preferred core network based at least in part on the first core network supporting the RRC inactive state.

In some embodiments, the preference for establishing the connection with one of the first core network or the second core network is determined based on an availability of a network slice on a virtual public land mobile network (VPLMN) or a PDU session associated with each of the first core network and the second core network.

In some embodiments, determining a preference for establishing a connection with one of the first core network or the second core network involves determining that a second message to be transmitted by the UE exceeds a maximum message size associated with the first core network. In these embodiments, a preference for the second core network may be determined based on one or both of determining that the second message to be transmitted by the UE exceeds the maximum message size associated with the first core network, or determining that the second core network supports segmentation of the messages sent over the air.

In some embodiments, the preference for establishing the connection with one of the first core network or the second core network may be based on the type of device (e.g., smartwatch, smart meter, smart phone, etc.).

In some embodiments, the preference for establishing the connection with one of the first core network or the second core network may be based on a status of the device. For example, the UE may prefer one core network over the other depending on its battery condition and/or battery use when communicating using the respective core network.

At 806, the UE may transmit a first message to the base station indicating the determined preference. For example, the UE may transmit a message indicating which of the first or second core network it would prefer to establish a connection with, based on one or more of the criteria described above.

At 808, the UE may receive a response message from the base station establishing a connection with the preferred core network. For example, as described in reference to FIG. 6B, the UE may receive an RRC connection reconfiguration message indicating system resource blocks and protocols associated with the established connection with the core network indicated by the UE at 806.

In some embodiments, the UE may receive a connection release message from the base station. In these embodiments, the UE may implement procedures for improved cell reselection in a mixed deployment environment. As one example, the UE may identify one or more frequencies associated with each of a first bucket, a second bucket, and a third bucket of frequencies, wherein frequencies in the first bucket support communication with the first core network (CN), wherein frequencies in the second bucket support communication with the second CN, and wherein frequencies in the third bucket support communication with both the first and second CNs. In other words, the UE may separate available scanning frequencies into buckets based on whether they support communication with a first CN, a second CN, or both CNs. Based on a determination that an ongoing communication session of the UE preferentially operates through the first core network, the UE may perform an ordered redirection search on frequencies in the first bucket, followed by the third bucket, followed by the second bucket. For example, the UE may be conducting a communication session with a 5GC when the connection release message is received. In this example, the UE may attempt reselection on frequencies in a first bucket that contains frequencies that support communication with a 5G CN only. If this search is unsuccessful (i.e., if reselection does not succeed on these frequencies), the UE may proceed to attempt reselection on frequencies in a third bucket that supports communication with both an EPC and a 5G CN. Finally, if this search is likewise unsuccessful, the UE may attempt reselection on frequencies that only support communication with an LTE CN.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A method, comprising:
by a user equipment device (UE),
discovering a base station, wherein the base station is configured to communicate with each of a first core network associated with a first radio access technology (RAT) and a second core network associated with a second RAT;

determining a preference for establishing a connection with one of the first core network or the second core network;

transmitting a first message to the base station indicating the determined preference;

receiving a response message from the base station establishing a connection with the preferred core network;

receiving a connection release message from the base station;

identifying one or more frequencies associated with each of a first bucket, a second bucket, and a third bucket of frequencies, wherein frequencies in the first bucket support communication with the first core network, wherein frequencies in the second bucket support communication with the second core network, and wherein frequencies in the third bucket support communication with both the first and second core networks; and based on a determination that an ongoing communication session preferentially operates through the first core network, performing an ordered redirection search on frequencies in the first bucket, followed by the third bucket, followed by the second bucket.

2. The method of claim 1, wherein the preference for establishing the connection with one of the first core network or the second core network is determined based on a device type of the UE.

3. The method of claim 1, wherein the preference for establishing the connection with one of the first core network or the second core network is determined based on an active networking flow running on the UE.

4. The method of claim 1, wherein the preference for establishing the connection with one of the first core network or the second core network is determined based on an availability of either a network slice on a virtual public land mobile network (VPLMN) or a network slice on a packet data unit (PDU) session associated with each of the first core network and the second core network.

5. The method of claim 1, wherein determining a preference for establishing a connection with one of the first core network or the second core network comprises:

determining that a second message to be transmitted by the UE exceeds a maximum message size associated with the first core network; and determining a preference for the second core network based at least in part on one or both of determining that the second message to be transmitted by the UE exceeds the maximum message size associated with the first core network or determining that the second core network supports segmentation of messages.

6. The method of claim 1, the method further comprising:

receiving system information from the base station indicating whether a $5^{th}$ Generation New Radio (5G NR) base station is present;

based on determining that the 5G NR base station is present, initiate a connection procedure with the 5G NR base station.

7. The method of claim 1, wherein the first core network is an evolved packet core (EPC) associated with a long term evolution (LTE) RAT, and wherein the second core network is a $5^{th}$ Generation core network associated with a $5^{th}$ Generation New Radio (5G NR) RAT.

8. The method of claim 1, wherein the base station is one of:
an enhanced node B (eNB); or
a gNB.

9. An apparatus, comprising:

a processor including circuitry configured to cause a user equipment device (UE) to:

discover a base station, wherein the base station is configured to communicate with each of a first core network associated with a first radio access technology (RAT) and a second core network associated with a second RAT;

determine a preference for establishing a connection with one of the first core network or the second core network, wherein the preference is determined based on an active data flow running on the UE, wherein the active data flow running on the UE is capable of utilizing a radio resource control (RRC) inactive state, wherein the first core network supports the RRC inactive state, and wherein the first core network is determined to be the preferred core network based at least in part on the first core network supporting the RRC inactive state;

transmit a first message to the base station indicating the determined preference; and receive a response message from the base station establishing a connection with the preferred core network.

10. The apparatus of claim 9, wherein the active data flow running on the UE is associated with a first data pattern, wherein the first data pattern experiences improved performance on the first core network, and wherein the preferred core network is the first core network.

11. The apparatus of claim 9, wherein determining the preference for establishing the connection with one of the first core network or the second core network based on the active data flow running on the UE comprises determining the preference based on one or more of a latency requirement, a throughput demand, and a connection reliability requirement associated with the active data flow.

12. The apparatus of claim 9, wherein the active data flow comprises a streaming application type.

13. The apparatus of claim 9, wherein the processor is further configured to cause the UE to:

receive a connection release message from the base station;

identify one or more frequencies associated with each of a first bucket, a second bucket, and a third bucket of frequencies, wherein frequencies in the first bucket support communication with the first core network, wherein frequencies in the second bucket support communication with the second core network, and wherein frequencies in the third bucket support communication with both the first and second core networks; and based on a determination that an ongoing communication session preferentially operates through the first core network, perform an ordered redirection search on frequencies in the first bucket, followed by the third bucket, followed by the second bucket.

14. A user equipment device (UE), comprising:
an antenna;
a radio coupled to the antenna; and
a processor including circuitry and coupled to the radio;
wherein the UE is configured to:
  discover a base station, wherein the base station is configured to communicate with each of a first core network associated with a first radio access technology (RAT) and a second core network associated with a second RAT;
  determine a preference for establishing a connection with one of the first core network or the second core network, wherein in determining a preference for establishing the connection with one of the first core network or the second core network, the UE is configured to:
    determine that a second message to be transmitted by the UE exceeds a maximum message size associated with the first core network; and
    determine a preference for the second core network based on one or both of determining that the second message to be transmitted by the UE exceeds the maximum message size associated with the first core network or determining that the second core network supports segmentation of messages;
  transmit a first message to the base station indicating the determined preference; and
  receive a response message from the base station establishing a connection with the preferred core network.

15. The UE of claim 14, wherein the UE is further configured to:
receive system information from the base station indicating whether a $5^{th}$ Generation New Radio (5G NR) base station is present;
based on determining that the 5G NR base station is present, initiate a connection procedure with the 5G NR base station.

16. The UE of claim 14,
wherein the base station comprises an enhanced node B (eNB) associated with a Long Term Evolution (LTE) RAT, wherein the UE is further configured to:
  receive system information from the base station indicating whether a $5^{th}$ Generation New Radio (5G NR) neighbor base station is present;
  based on a determination that no 5G NR neighbor base station is present, determine whether the base station satisfies an Evolved Universal Mobile Telecommunications System (UMTS) Terrestrial Radio Access (EUTRA) New Radio (NR) Dual Connectivity (ENDC) criterion;
  based on a determination that the base station satisfies the ENDC criterion, enable ENDC with the base station;
  based on a determination that the base station does not satisfy the ENDC criterion, detach from the base station and scan for a second base station with a stronger signal strength than the base station.

17. The UE of claim 14, wherein the UE is further configured to:
determine whether the base station is deployed in a standalone format or with Evolved Universal Mobile Telecommunications System (UMTS) Terrestrial Radio Access (EUTRA) New Radio (NR) Dual Connectivity (ENDC); and
wherein discovering the base station comprises scanning for a $5^{th}$ Generation New Radio (5G NR) base station, wherein performing said scanning is performed based at least in part on determining whether the base station is deployed with ENDC or in the standalone format.

18. The UE of claim 14,
wherein the preference for establishing the connection with one of the first core network or the second core network is determined based on an availability of either a network slice on a virtual public land mobile network (VPLMN) or a network slice on a packet data unit (PDU) session associated with each of the first core network and the second core network.

19. The UE of claim 14,
wherein the first core network is an evolved packet core (EPC) associated with a long term evolution (LTE) RAT, and
wherein the second core network is a $5^{th}$ Generation core network associated with a $5^{th}$ Generation New Radio (5G NR) RAT.

20. The UE of claim 14, wherein the UE is further configured to:
receive a connection release message from the base station;
identify one or more frequencies associated with each of a first bucket, a second bucket, and a third bucket of frequencies, wherein frequencies in the first bucket support communication with the first core network, wherein frequencies in the second bucket support communication with the second core network, and wherein frequencies in the third bucket support communication with both the first and second core networks; and
based on a determination that an ongoing communication session preferentially operates through the first core network, perform an ordered redirection search on frequencies in the first bucket, followed by the third bucket, followed by the second bucket.

* * * * *